Nov. 26, 1963 P. J. McKEOWN 3,112,484
EXTERNAL PULSE SOURCE TARGET RESTITUTER
Filed Dec. 19, 1960 9 Sheets-Sheet 1

Fig. I.

INVENTOR
PATRICK J. McKEOWN
BY
ATTORNEYS

Nov. 26, 1963 P. J. McKEOWN 3,112,484
EXTERNAL PULSE SOURCE TARGET RESTITUTER
Filed Dec. 19, 1960 9 Sheets-Sheet 2
*Fig. 2.*
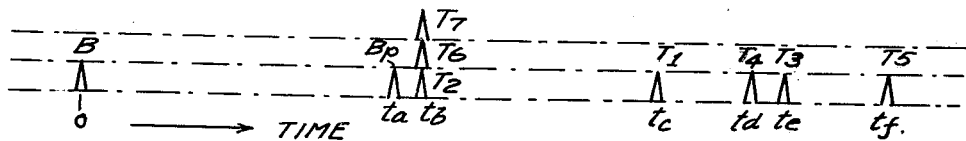
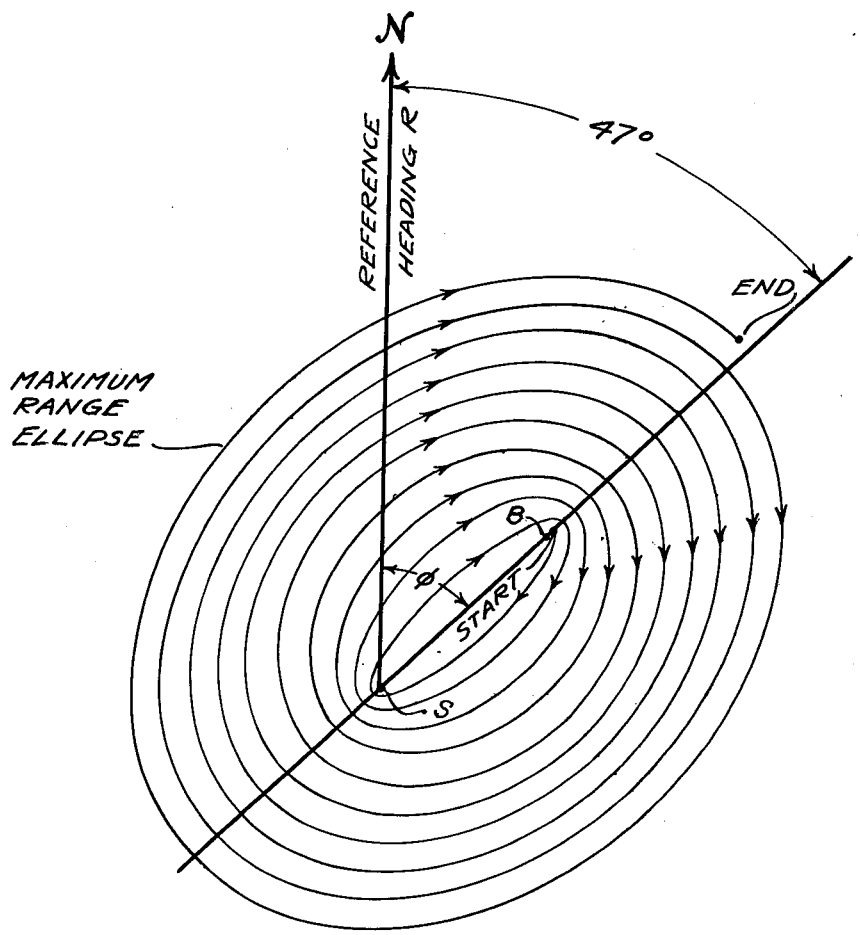
*Fig. 3.*
INVENTOR
PATRICK J. McKEOWN
BY
ATTORNEYS Nov. 26, 1963   P. J. McKEOWN   3,112,484
EXTERNAL PULSE SOURCE TARGET RESTITUTER
Filed Dec. 19, 1960   9 Sheets-Sheet 3
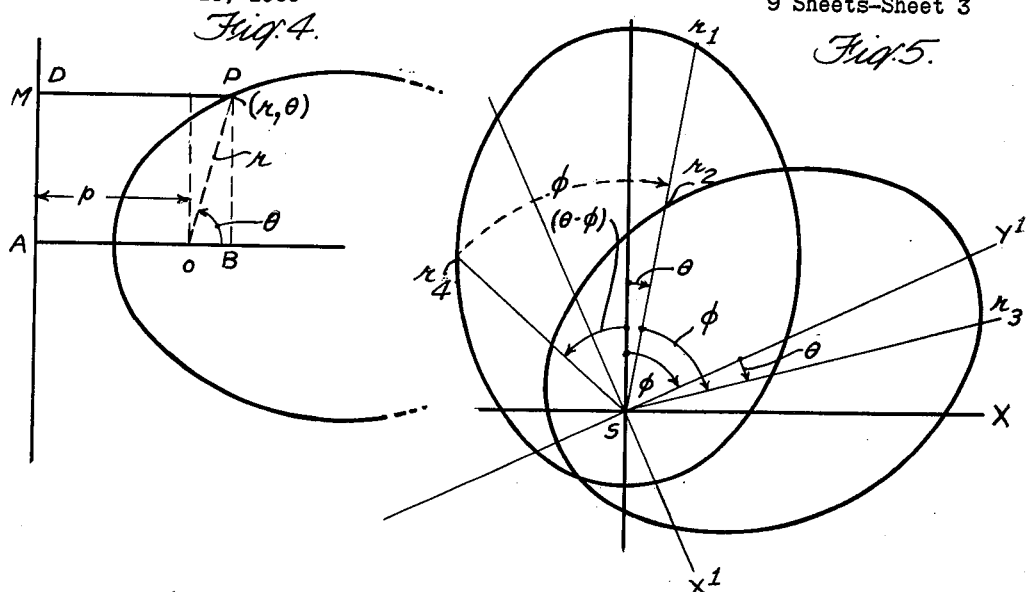
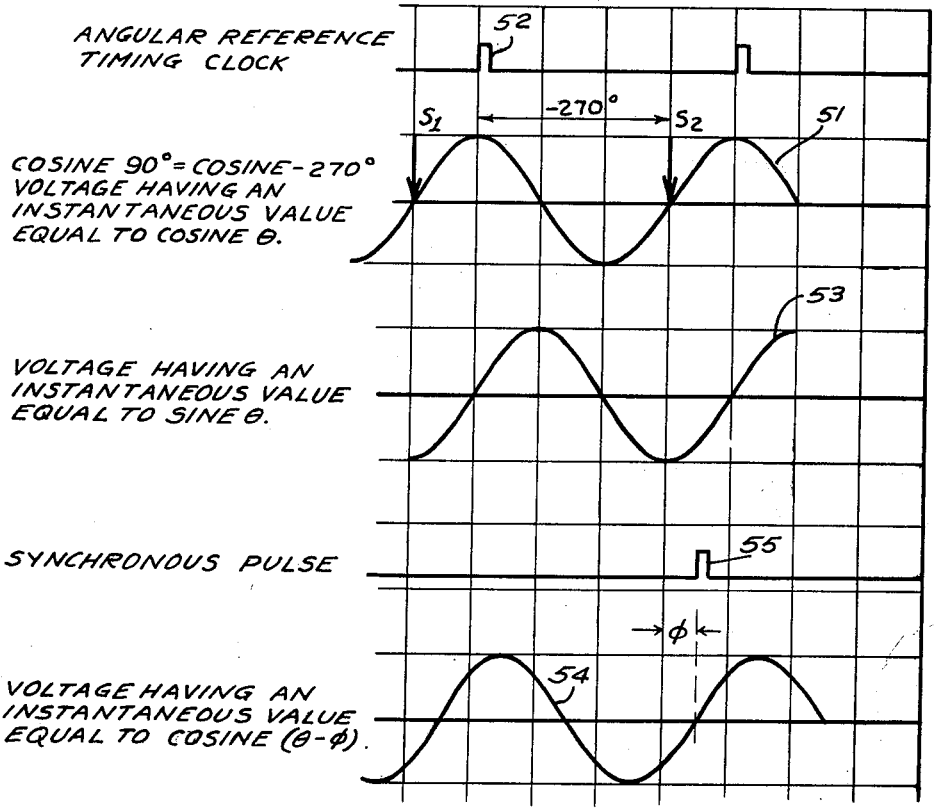

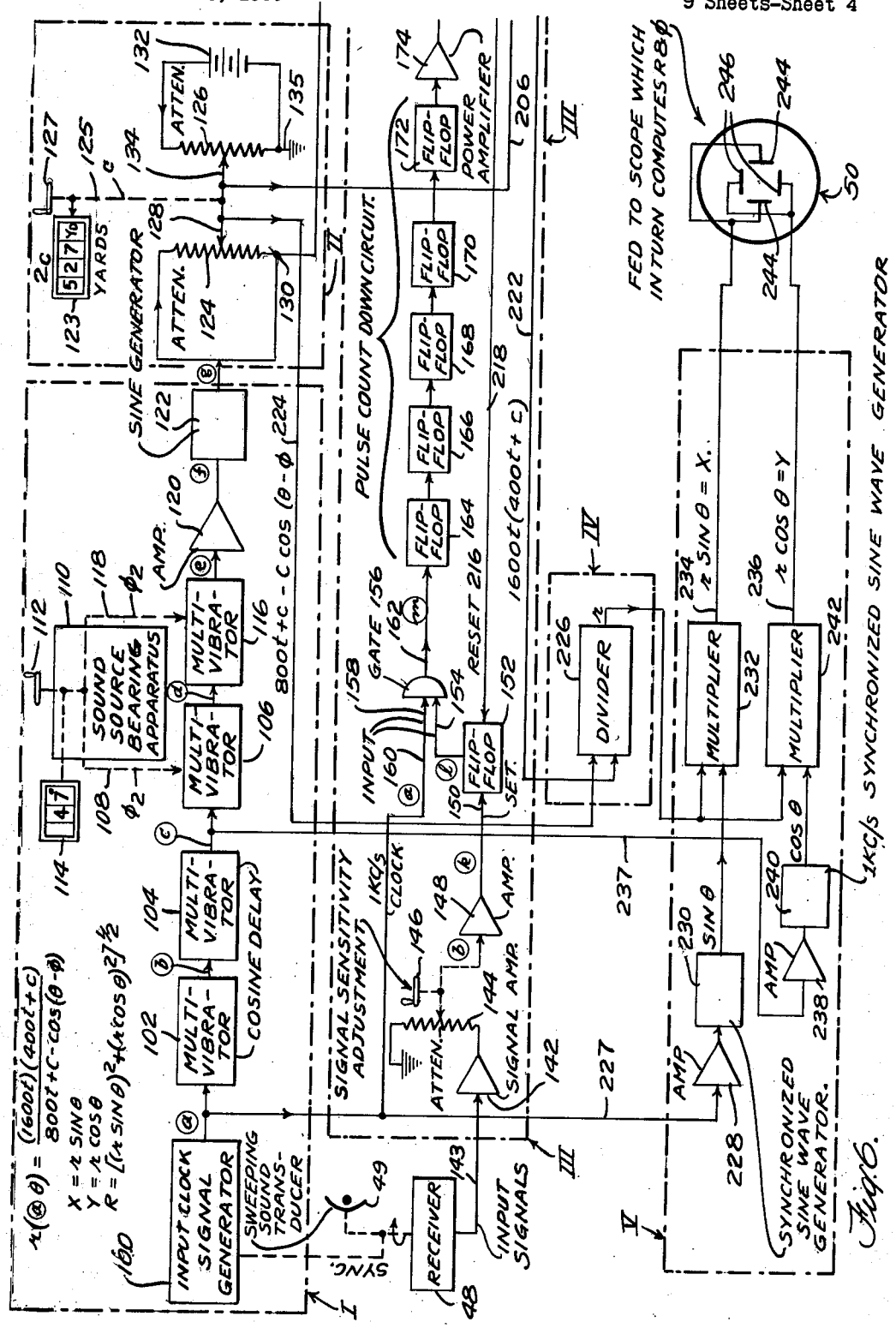

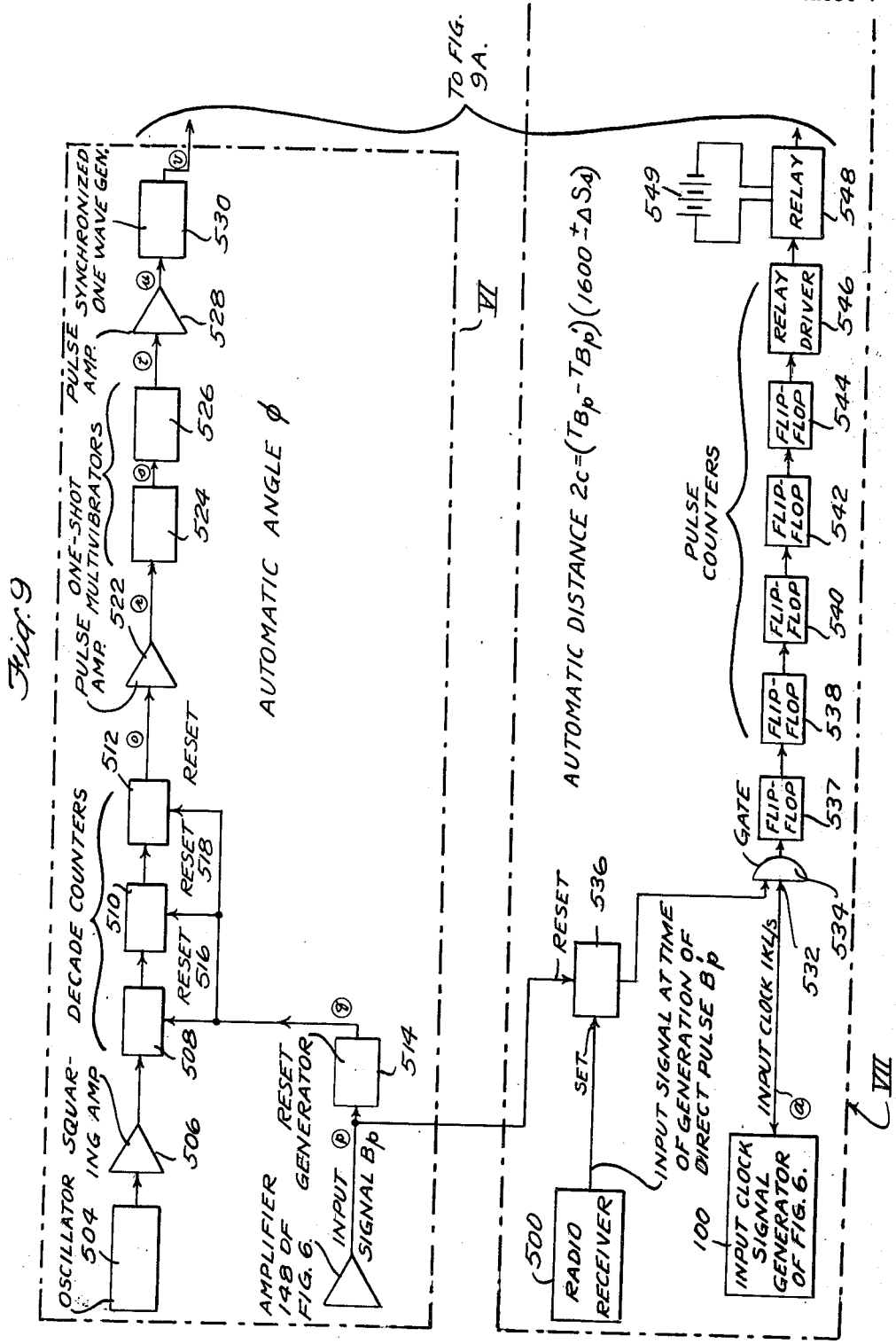

INVENTOR
PATRICK J. MCKEOWN
BY Borst & Borst
ATTORNEYS

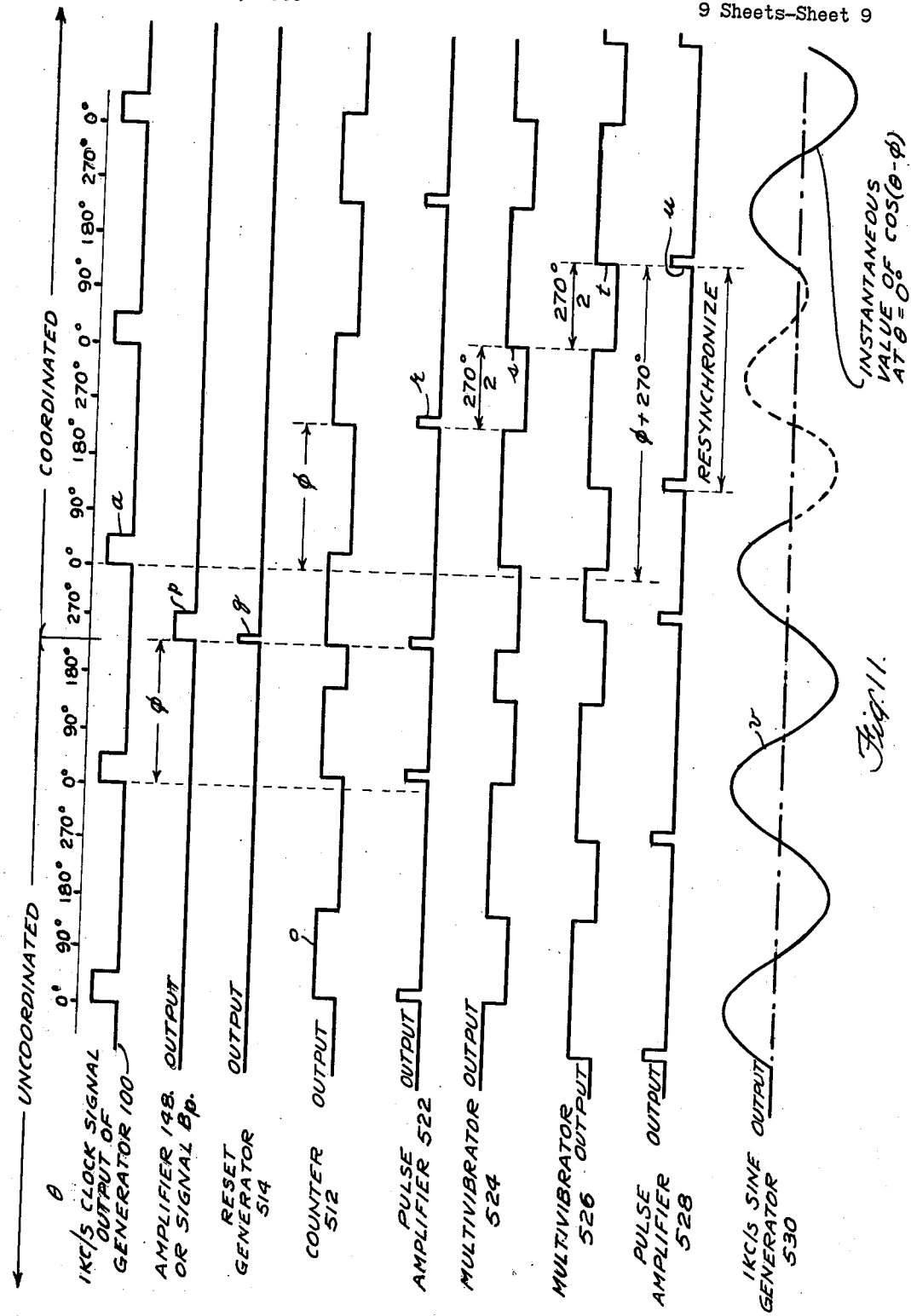

United States Patent Office 3,112,484
Patented Nov. 26, 1963

3,112,484
EXTERNAL PULSE SOURCE TARGET RESTITUTER
Patrick J. McKeown, Syosset, N.Y., assignor to Sperry Rand Corporation, Ford Instrument Company Division, Wilmington, Del., a corporation of Delaware
Filed Dec. 19, 1960, Ser. No. 76,935
26 Claims. (Cl. 343—112)

This invention relates to systems for locating unseen objects and particularly underwater targets with pulsating sound waves.

It is generally known how to employ underwater non-energy radiating or passive listening sonars to determine the direction from which an externally generated sound is arriving. By known triangulation techniques, the range of the external sound source (which is normally self-generating noise from an engine on the target vehicle) can be determined by measurements at two or more receiving positions. However, such range determinations cannot be instantaneous with a single receiver and movement of the target between directional determinations at two or more receiving positions by the same receiver will defeat accurate range resolution.

Target locating systems relying upon radar principles have the serious disadvantage that the searching station or vehicle discloses its location by radiating detectable energy each time probing pulses of wave energy are released.

An objection of this invention is to provide a system for locating unseen targets from a single receiving position without radiating position revealing wave energy.

Another object of this invention is to provide a visual display system showing the instantaneous location of the unseen targets relative to the receiver position, the targets being deployed in random azimuth directions and ranges.

With the operation of this system for locating underwater targets, there is produced a plan display of the targets in the area from a single receiver location without the need for the vehicle containing the receiver to introduce sound energy pulses into the surrounding water. This is an important security consideration in underwater warfare. In the system contemplated, the receiving vehicle, such as a submarine or a helicopter operating in secrecy, can use the wave energy pulses generated by another vehicle or by a remote noise maker deposited and left behind in the water by the receiving vehicle itself. Where the receiver is located on a destroyer which inherently generates a large amount of noise, there may be some tactical advantage in deluding the enemy into believing that there are two attackers in the vicinity.

Where the receiver-locator is installed on a submarine which is operating in conjunction with a destroyer, the target vehicle would tend to be deluded into believing that it was undetected, since the readily detectable destroyer would not be operating in a hostile manner. The submarine, in the meantime, would be receiving a complete picture of the environment and could be moving against the target without giving away its own presence.

By providing an instantaneous plan picture of the area from a single receiver position, considerable advantages are gained by eliminating the necessity for complex manual computations usually based on guesses as to target motion that are now required to implement the attack when the position measurements must be made from at least two receiver locations. The display equipment of this invention also permits a visual evaluation of the returned signals which is invaluable in understanding the nature of the target.

Other tactical uses of the invention can be readily visualized such as its application to guide a submarine without active sounding sonar gear through a mine field where the multiple targets are not generating sound waves. Furthermore, this invention can be effectively employed in a buoy system which utilizes a passive listening sonar receiver to telemeter its azimuth target information to a central station. If a source of pulsed sound energy is also placed in the water, the central station can then reconstruct a plan picture of the area under surveillance through the use of this technique.

In accordance with this invention, there is provided a system for locating a target, or targets, comprising a pulsating source of wave energy and a wave energy receiver spaced from the source, the receiver having a controllable directional characteristic of reception and means for sweeping its directional characteristic of reception past the source and the target.

As a feature of the invention, there is provided display equipment for representing the position of a target, or targets, comprising a first means displaying a source of pulsating wave energy and a wave energy receiver spaced from the source, and having a rotating directional characteristic of reception, a second means for tracing an ellipse with foci at the source and the receiver, respectively, which establishes a locus of all possible targets from which wave energy reflected from the target to the receiver arrives at a time after the unreflected wave energy travels directly from the source to the receiver. A third means which is responsive to a condition when the directional characteristic of the antenna is directed towards the target, is coupled to said receiver for coacting with the ellipse tracing means to display the target on the ellipse.

Other objects and features of the present invention will be set forth or apparent in the following description and illustrated in the accompanying drawings, which disclose, by way of example and not by way of limitation, in a limited number of embodiments, the principle of the invention and implementations thereof.

In the drawings:

FIG. 2 is a diagram showing the time of receipt of sound pulses by the receiver shown in FIG. 1;

FIG. 3 illustrates a sweep pattern for a cathode ray tube to trace an ellipse having an eccentricity varying with time with foci at the sound source and receiver positions shown in FIG. 1 in accordance with the invention;

FIG. 4 is a mathematical representation for deriving formulae to locate and display the targets shown in FIG. 1;

FIG. 5 is a mathematical representation for modifying the formulae derived in conjunction with FIG. 4 to consider a rotation of the ellipse shown in FIG. 4 about the origin;

FIGS. 6 and 6A are block diagrams, partly in schematic, for one embodiment of the invention which utilizes the formulae developed in conjunction with FIGS. 1, 4 and 5;

FIG. 7 illustrates waveforms to explain how a cosine function, as required by the apparatus of FIG. 6, can be generated by a standard sine generator;

FIG. 9 shows another embodiment of the invention as a modification of FIG. 6 wherein the bearing angle and the distance between the source and the receiver are automatically inserted into the display computer;

FIG. 11 shows waveforms of signals as they appear at identified locations in the equipment of FIG. 9.

Figure 1:
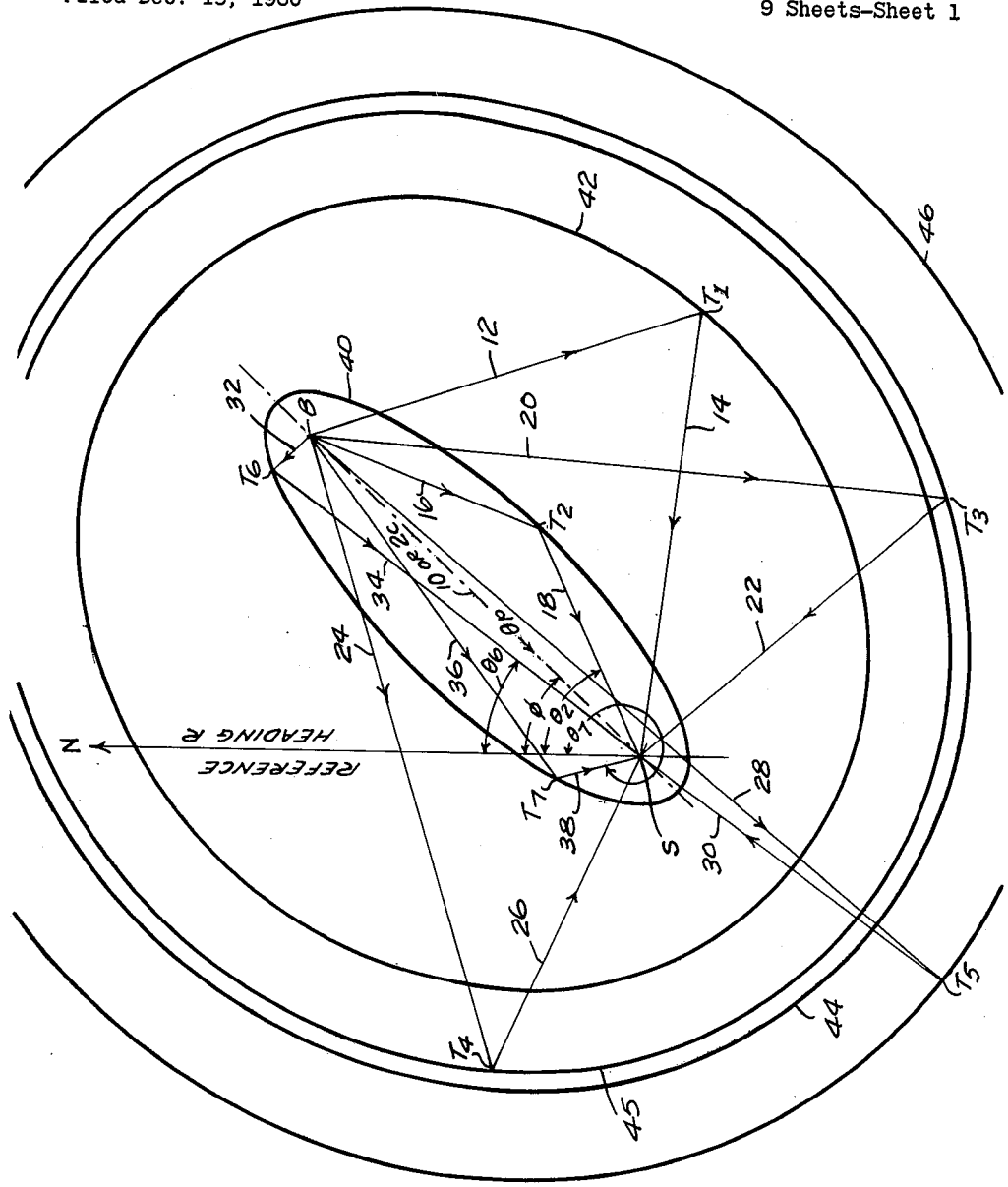
FIG. 1 is a plan view showing a pulsating source of sound energy in known relationship to a receiver spaced therefrom and a plurality of underwater targets which are to be located and displayed in accordance with this invention.

FIG. 1 shows in plan view a submerged external pulsating wave energy source B, as for instance a pulsating sound source, a receiver S in a vehicle, such as a submarine, and a group of underwater targets designated as $T_1$, $T_2$, $T_3$, $T_4$, $T_5$, $T_6$ and $T_7$. It is to be assumed that the distance 10 between B and S is known as well as the bearing angle $\phi$ from a reference direction or heading R, such as north, to the line 10 connecting B and S. The tactical problem is to locate the unknown target positions $T_1$, $T_2$, $T_3$, $T_4$, $T_5$, $T_6$ and $T_7$ from pulses of wave energy originating at B and received at S including reflections from the targets.

The length of the sound paths from B to S is shown as 10; from B to $T_1$ and from $T_1$ to S as 12 and 14, respectively; from B to $T_2$ and from $T_2$ to S as 16 and 18, respectively; from B to $T_3$ and from $T_3$ to S as 20 and 22, respectively; from B to $T_4$ and from $T_4$ to S as 24 and 26, respectively; from B to $T_5$ and from $T_5$ to S as 28 and 30, respectively; from B to $T_6$ and from $T_6$ to S as 32 and 34, respectively; and from B to $T_7$ and from $T_7$ to S as 36 and 38, respectively. The direction of travel of the sound pulses are as shown by arrowheads in FIG. 1, the individual sound wave patterns emanating concentrically from position B. The receiver S receives a direct pulse along line 10 as $B_p$ and reflected pulses from $T_1$, $T_2$, $T_3$, $T_4$, $T_5$, $T_6$ and $T_7$ along lines 14, 18, 22, 26, 30, 34 and 38, respectively. The direct pulse from source B and reflected pulses from the targets will be received at receiver S in the order determined by the length of their respective overall sound paths, assuming that the sound travels straight and true. While this assumption is not strictly true, it is a common assumption made in all sonar considerations because of the great complexity of computing the actual sound path.

The pulse $B_p$ from B directly to S along path 10 will always be received at S as a first pulse because one side of a plane triangle must always be shorter than the sum of the other two sides. Following the receipt of pulse $B_p$ designated hereinafter as the prime water pulse, the target pulses will be received at S in a scrambled order as determined by their respective length of overall sound path, viz., the sound path from the source B to each target plus the reflected sound path from each target to the receiver S.

The order of receipt of signals at receiver S for FIG. 1 is shown on the time scale of FIG. 2. On such graphical representation, the pulse B originates at the source at time zero. The prime water pulse signal $B_p$ is received at a time instant $t_a$; the signals from targets $T_2$, $T_6$ and $T_7$ simultaneously at a later time instant $t_b$; the signal from $T_1$ at a later time instant $t_c$; the signal from $T_4$ at later time instant $t_d$; the signal from $T_3$ at later time instant $t_e$; and the signal from $T_5$ at later time instant $t_f$. However, the actual order of targets in FIG. 1 in terms of range from S is quite different, namely, $T_7$, $T_2$, $T_4$, $T_5$, $T_3$, $T_1$, B and $T_6$. It is to be observed that the target signals would be received at S from the same direction as shown in FIG. 1 regardless of the location of the transmitting source B relative to the receiver S.

According to the present inventive concept, since the pulses arrived simultaneously from targets $T_2$, $T_6$ and $T_7$, such targets must be located somewhere on one elliptical trace 40 having foci at B and S. This follows since an ellipse can be defined as the locus of all points for which the sum of the distance from or to two fixed points, called foci, is constant. As the signals from targets $T_2$, $T_6$ and $T_7$ arrive simultaneously at S, their sound paths 16 plus 18, 32 plus 34 and 36 plus 38 are equal to the same constant. Hence targets $T_2$, $T_6$ and $T_7$ are located on a single ellipse having foci at B and S. Developing this inventive concept, it can be induced that target $T_1$ must also be located on another ellipse 42 having foci at B and S. Also, all of the other targets $T_3$, $T_4$ and $T_5$ are located on different elliptical traces 44, 45 and 46, each elliptical trace having foci at B and S, respectively. Accordingly, for each specific time interval, such as $t_a$ to $t_c$, in FIG. 2, between the instant of reception at S of the prime water pulse $B_p$ and the instant of reception of a reflected pulse from a target, such as $T_1$, there can be displayed an ellipse, such as 42, upon which the target $T_1$ lies. Also each of the ellipses 40, 42, 44, 45 and 46 with foci at B and S can be defined by its eccentricity. In other words, as the time interval runs from $t_a$ to $t_b$ to $t_c$ to $t_d$ to $t_e$ to $t_f$ to . . . $t_n$, the eccentricity of the elliptical trace which is associated with specific time intervals changes in some corresponding manner.

After an elliptical trace such as 42 can be displayed from the measurement of time interval $t_a$ to $t_c$, target $T_1$ can be located from the intersection of the ellipse 42 and a straight line drawn from S in the direction from which the reflected pulse travels in moving from $T_1$ to S. Also targets $T_2$, $T_6$ and $T_7$ (all located on ellipse 40) can be likewise located after bearing angles, $\theta_2$, $\theta_6$ and $\theta_7$ relative to the reference heading are determined with equipment known in the prior art and employing known sonar techniques.

For implementing the aforedeveloped inventive concept to display targets $T_1$ to $T_7$ relative to B and S on a cathode tube, it becomes convenient to provide a receiving transducer at S with a revolving directional receiving characteristic, means for displaying B and S on a cathode tube face in correct azimuth and spaced relationship to each other, means for recognizing the prime water pulse $B_p$, means for triggering a sweep for the cathode ray tube by the arrival of $B_p$ and a sweep generator for tracing an elliptical sweep having varying eccentricity with time about B and S as foci and a writing speed about S in synchronism with the revolving receiving transducer. FIG. 3 illustrates the desired sweep pattern of such a sweep generator which starts an ellipse with varying eccentricity at transmitter position B and ends at the extreme desirable range of the display.

The following mathematics in conjunction with FIG. 4 will derive the required formulae for locating the targets shown in FIG. 1. In FIG. 4, the revolving receiver transducer S is represented at O while P is a target positioned on an ellipse at a distance $r$ from a prime focus O and having a bearing $\theta$ relative to line AOB. For such ellipse, the major axis is $2a$ and the distance between foci (corresponding to 10 in FIG. 1) is $2c$.

Now, $$p = OA$$

$$e = \frac{c}{a}; \ e < 1 \text{ for an ellipse}$$

As shown in "Introductory College Mathematics," Milne and Davis, Revised Edition, pages 270, 291 and 292, the equation for an ellipse is:

$$r = \frac{ep}{1 - e \cos \theta} \qquad (1)$$

or $$r = \frac{\frac{c}{a}p}{1 - \frac{c}{a} \cos \theta}$$

where $$a^2 = \frac{p^2 e^2}{(1 - e^2)^2}$$

Now solving for $p^2$ $$p^2 = \frac{a^2}{e^2}(1 - e^2)^2$$

but $$e^2 = \frac{c^2}{a^2}$$

Hence
$$p^2 = \frac{a^4}{c^2}\left(1-\frac{c^2}{a^2}\right)^2$$
$$= \frac{a^4}{c^2}\left(1-\frac{2c^2}{a^2}+\frac{c^4}{a^4}\right)$$
$$= \frac{a^4}{c^2}\left(1-\frac{2c^2}{a^2}+\frac{c^4}{a^4}\right)$$
$$= \frac{a^4}{c^2}-2a^2+c^2$$

Now returning to Equation 1

$$r = \frac{ep}{1-e\cos\theta}$$

$$r = \frac{\frac{c}{a}\left(\frac{a^4}{c^2}-2a^2+c^2\right)^{1/2}}{1-\frac{c}{a}\cos\theta}$$

$$\frac{ra}{c}\left(1-\frac{c}{a}\cos\theta\right) = \left(\frac{a^4}{c^2}-2a^2+c^2\right)^{1/2}$$

$$\frac{ra}{c} - r\cos\theta = \left(\frac{a^4}{c^2}-2a^2+c^2\right)^{1/2}$$

squaring both sides $$\frac{r^2a^2}{c^2}-\frac{2r^2a}{c}\cos\theta + r^2\cos^2\theta = \frac{a^4}{c^2}-2a^2+c^2$$

$$r^2\left(\frac{a^2}{c^2}-2\frac{a}{c}\cos\theta+\cos^2\theta\right) = \frac{a^4}{c^2}-2a^2+c^2$$

$$r^2 = \frac{\frac{a^4}{c^2}-2a^2+c^2}{\frac{a^2-2ac\cos\theta+c^2\cos^2\theta}{c^2}}$$

$$r^2 = \frac{\frac{a^4-a^2c^2+c^4}{c^2}}{\frac{a^2-2ac\cos\theta-c^2\cos^2\theta}{c^2}}$$

$$r^2 = \frac{a^4-2a^2c^2+c^4}{a^2-2ac\cos\theta+c^2\cos^2\theta}$$

$$r = \frac{(a^2-c^2)}{(a-c\cos\theta)} \quad (2)$$

This equation has the prime foci on the origin and the major axis is oriented along the 0° (Y) coordinate. The equation, as is, is not rotatable.

Now, to rotate, the ellipse about the origin, reference is made to FIG. 5.

Equation 2 will solve for $r_1$ given appropriate values of $a$, $c$ and $\theta$. It is desired to rotate the same ellipse through an arbitrary angle $\phi$. It is, therefore, required that the value $r_2$ be produced by the equation at the same angle $\theta$. By the geometry of FIG. 5, it may be seen that $r_2$, i.e., $r_4$, will be computed at the angle of $(\theta-\phi)$. In order to rotate the ellipse through the angle $\phi$, the value $r_4$ must be thereafter rotated through the angle $\phi$ (equivalently plotted along the original $\theta$ angle). This is simple to produce since $r_2$ can be computed using $(\theta-\phi)$ and then used in conjunction with the angle $\theta$. Therefore $$r = r_2 = \frac{a^2-c^2}{a-c\cos(\theta-\phi)} \quad (3)$$

$\phi$ is the orientation of the major axis of the ellipse.
$\theta$ is the generation angle for the ellipse.

With respect to the problem at hand and FIG. 1

$2a$=length of major axis of ellipse,
= length of sound path from sound source B to a target to receiver S at a particular instant in time,
$2c$=distance 10 between sound source B and receiver S, $2a$=(speed of sound in water)×(time since arrival at receiver of pulse from source)+$2c$ Assuming the approximate value for speed of sound in water=4800 ft./sec.=1600 yards/sec., then:

$2a$=(4800 ft./sec.)×(number of seconds)+$2c$ (in feet)

Or, if $t$=time since arrival at receiver S of pulse from source B, then
$2a = 4800t+2c$, or
$a = 2400t+c$ (in feet), or
$a = 800t+c$ (in yards)

Now, let
$\theta$=angle from which sound pulse is received with respect to reference heading R
(Reference may be either true north or dead ahead on receiving vehicle or some bearing having similar significance), and
$\phi$=angle between reference heading R and the bearing line running between receiver S and sound source B $$r(@\theta) = \frac{a^2-c^2}{a-c\cos(\theta-\phi)} \quad (\text{see } (3))$$

$$r(@\theta) = \frac{(800t+c)^2-c^2}{(800t+c)-c\cos(\theta-\phi)}$$

$$r(@\theta) = \frac{64\times 10^4 t^2+16\times 10^2 tc+c^2-c^2}{800t+c-c\cos(\theta-\phi)}$$

$$r(@\theta) = \frac{(1600t)(400t+c)}{800t+c-c\cos(\theta-\phi)} \quad (4)$$

Also, for cathode ray scope deflection:

$$X = r\sin\theta \text{ and } Y = r\cos\theta \quad (5)$$

While the embodiments which will now be described specifically relate to the employment of sound waves for the radiating wave energy traveling in water, it is to be understood that this invention is not restricted in its scope to the utilization of sound waves for the wave energy or water as the transmitting medium. The particular references to sound waves and water are by way of illustration only to describe a particularly important application of the inventive concept. Clearly, other forms of radiating wave energy such as electromagnetic radiation or radio waves could be adapted to the invention in conjunction with equipment peculiarly required to transmit and receive such forms of radiating wave energy.

One embodiment of the invention as shown in FIG. 6 will now be described in which, referring to FIG. 1, the source B is a pulsating sound source providing a pulse having a width of, say, one millisecond. A receiver 48 in FIG. 6 at position S is a sonar receiver having a revolving antenna sound transducer 49 with a directional characteristic of reception which sweeps 360° in azimuth during the duration of the generated pulse wave at B. The revolving antenna 49 controls other equipment for supplying a pulse each time the sound transducer 49 or listening head passes through the reference heading R. This reference heading R may be the fore and aft line of the receiving vehicle or true north or any other known reference having similar significance. It is to be noted that pulses emanating from B can be generated regularly or irregularly, one pulse sufficing if desired. The apparatus is self-synchronizing with the incoming prime water pulse $B_p$ and the effect of the irregularity of the generation of pulses would be to require a display device, for instance a cathode ray tube 50, having a longer persistence characteristic. The equations as previously derived to which the apparatus shown in FIG. 6 must respond is repeated at the top of such figure which, for convenience, has been divided as follows:

(a) Section I for the generation of a voltage instantaneously equal to the cosine of theta minus phi $(\theta-\phi)$;
(b) Section II for the generation of a voltage equal to the half distance C between the sound source B and the receiver S as well as for the multiplication of other functions by C;

(c) Section III for the generation of time functions and multiplication of other functions by time and reset to zero;

(d) Section IV for the division of generated functions to produce the range R; and (e) Section V for the multiplication of R by the sine and cosine of the angle theta ($\theta$) to produce the X and Y sweep deflection voltages to display the targets on cathode ray tube 50.

*Section I.—Production of Voltages Equal to cos $(\theta-\phi)$*

Apparatus in FIG. 6 which produces an instantaneous voltage equal to the cosine of the angle theta ($\theta$) minus phi ($\phi$) will now be described with reference to FIG. 7. Such instantaneous voltage varying with time will complete the convolutions normally described by the locus of a complete cosine curve. While the system will deal with the instantaneous value of the voltage, it is easier to consider one full cycle of the voltage variation.

Curve 51 in FIG. 7 shows a cosine curve synchronized with the angle swept by a rotating listening head 49 (FIG. 6) located at position S on FIG. 1, the sweeping angle being measured from the reference heading R shown on the latter figure. Each time the listening head 49, or sound pickup transducer, passes through the reference direction R a clock pulse 52 is produced as shown in FIG. 7. It would be desirable to provide a cosine voltage 51 synchronized with this heading reference pulse 52. However, a standard type of synchronized oscillator produces a sine wave voltage synchronized to the reference pulse 52 as shown by curve 53, it being understood that the function of time in all illustrations of FIG. 7 runs along from left to right as increasing abscissa values. Since it is not feasible, after receipt of the timing pulse, to move back into time in order that the voltage generation may have been begun earlier, another method of generating a cosine wave must be used. As contemplated, the "first" timing pulse will be delayed for a time equal to 270° in phase angle. All subsequent sine waves will then be synchronized as cosine voltage with the reference pulses. This delay is illustrated on curve 51, where $S_1$ is the desired but impossible starting point and $S_2$ is the starting point synchronized with the pulse 52 delayed by 270°. This is the method to be used by which a voltage is produced that has instantaneous values equal to the cosine of theta ($\theta$).

In order to produce an instantaneous voltage equal to the cosine of theta minus phi, the starting pulse must be further delayed to introduce the angle phi ($\phi$). It should be emphasized that these phase delays are real time delays which only affect the sweep generation during the first complete cycle, as for instance the first millisecond of the computation. There are no further real time aberrations to disrupt the computation during the succeeding thousands of cycles. Curve 54 in FIG. 7 shows the generation of a voltage corresponding to cosine theta minus phi, cos $(\theta-\phi)$, which is synchronized by a pulse 55 which is delayed by the angle phi relative to curve 51, the angle phi corresponding to such angle $\phi$ as shown on FIG. 1 at receiver S between the reference heading R and the bearing line between the receiver S and the pulsing wave source B.

Figure 8:
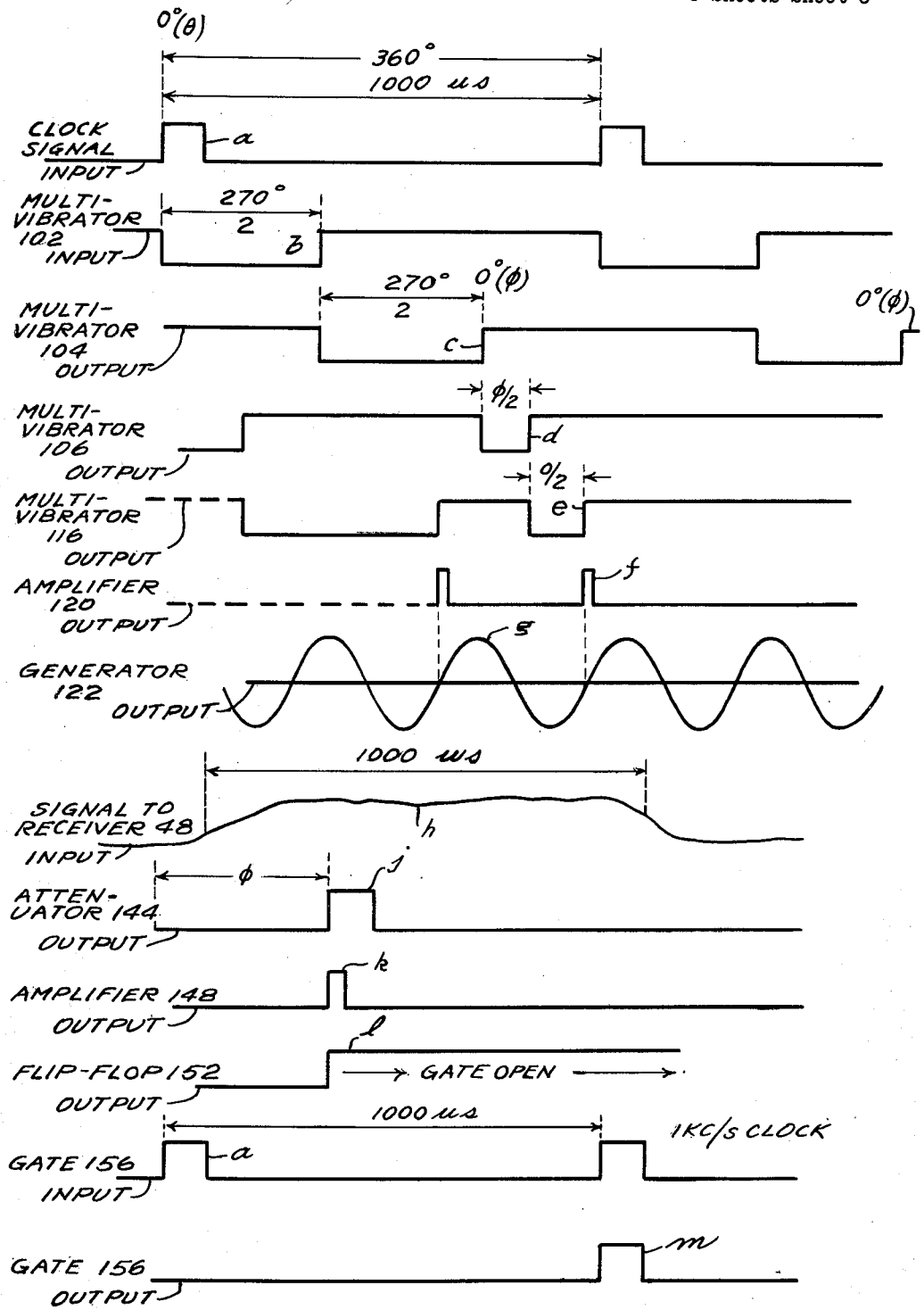
FIG. 8 shows waveforms of signals as they appear at identified locations on FIG. 6.

Reference is now made to that section of the apparatus diagram in FIG. 6 which is designated Section I as well as to the waveforms shown in FIG. 8. For clarifying the explanation, the location on FIG. 6 of waveforms identified by alphabetical letters in FIG. 8 will be shown by the same letters circumscribed by circles.

Input clock signal generator 100 provides an input clock signal shown as curve *a* in FIG. 8, the generator being synchronized with the angularly sweeping sound transducer 49 so that the pulse *a* occurs when the directional characteristic of the sound transducer is pointing along the reference heading R shown in FIG. 1. It will be assumed, for the sake of example only, that the clock signal has a time period of 1000 microseconds. Such angle reference pulse *a* is applied to a one-shot multivibrator 102 to produce a phase delay of 270°/2 which is shown as curve *b*. The inverted output from one-shot multivibrator 102 is employed in a manner so that its positive rising edge (which is delayed by 270°/2) triggers a one-shot multivibrator 104 which produces another delay of 270°/2 as shown by curve *c*. The total delay of the pulse through one-shot multivibrators 102 and 104 is 270°, such delay being required in order to produce a cosine function with a sine wave generator as previously explained in connection with curve 51 in FIG. 7. Preferably two one-shot multivibrators are used to produce the total required delay of 270° since the units are normally limited in their permissible duty cycle.

Since the targets $T_1$ to $T_7$ in FIG. 1 are to be located with reference to the sound source B, a delay designated the phi ($\phi$) delay must be introduced to generate a voltage cos $(\theta-\phi)$ as required by derived Formula 3. Accordingly, the inverted output of multivibrator 104 triggers a one-shot multivibrator 106 which is controlled by output 108 of sound source bearing apparatus 110, the latter being manually adjusted as by hand crank 112, so that the known bearing angle $\phi$ of the sound source B at receiver S relative to the reference heading R appears on a visual register 114. For the tactical plan shown in FIG. 1, hand crank 112 is turned until register 114 reads an angle $\phi$ of 47°. Output 108 of 110 adjusts one-shot multivibrator 106 to provide a delay of $\phi/2$ as shown by curve *d*. The inverted output of multivibrator 106 triggers a one-shot multivibrator 116 which is adjusted by a second output 118 of sound source bearing apparatus 110 to produce a similar delay of $\phi/2$ as shown by curve *e*. The inverted output of one-shot multivibrator 116 triggers a pulse amplifier 102 to produce pulses of a predetermined width as shown by curve *f* synchronized to the positive rising edge of the output of the one-shot multivibrator 116. The phase position of the output pulse *f* from pulse amplifier 120 is equal to the total delay produced by all preceding elements 102, 104, 106 and 116 or 270°+$\phi$ and is used to trigger a synchronized sine wave generator 122. The instantaneous voltage output of sine wave generator 122 is the cosine of the angle theta minus phi, cos $(\theta-\phi)$ as shown by curve *g* in FIG. 8 or curve 54 in FIG. 7, such curves being illustrated for an assumed $\phi$ of 47° to correspond to the tactical plan of FIG. 1.

*Section II.—Generation of a Voltage Equal to the Half Distance C Between the Sound Source B and the Receivers and Multiplication of Other Functions by C*

Reference will now be made to Section II of FIG. 6 together with the waveform diagrams shown in FIG. 8.

Multiplication by the factor C (the half distance between the source B and receiver S which is ½ the distance 10 in FIG. 1) is accomplished by passing appropriate signal voltage through variable attenuators 124 and 126 which may be potentiometers mechanically adjusted by a hand crank 127 controlling a common shaft 125 of potentiometers 124 and 126 in accordance with the known distance 2C (or distance 10 in FIG. 1) as indicated on register 123. This value of 2C is changed to C by appropriate gear ratios on shaft 125 (not shown). As shown in FIG. 6, the signal output *g* from generator 122 is applied as excitation to potentiometer 124. The voltage out of wiper 128 of potentiometer 124, referred to a zero end 130 of its resistive winding, is C cosine $(\theta-\phi)$.

Potentiometer 126 is excited by a D.C. reference voltage as from a battery 132. The voltage out of wiper 134 of potentiometer 126 referred to a zero grounded end 135 of its resistive winding is a pure function of C.

The zero end 130 of the resistive winding of potentiometer 124 is raised above ground by the value of the function $800t+c$ as will be described hereinafter. The voltage out of the wiper 128 of potentiometer 124, referred to ground, therefore will be $800t+c-c\cos(\theta-\phi)$.

*Section III.—Generation of Time Functions and Multiplication of Other Functions by Time and Reset to Zero*

The apparatus of Section III in FIG. 6 is self-synchronizing to the input prime water pulse signal $B_p$ received directly from source B. As the listening head 49 rotates through 360°, as for example in one millisecond, it will extract a portion of the prime water pulse signal $B_p$ for use within the sonar receiver 48 and, additionally, for use in Section III. If such signal is longer than one millisecond, the listening head will merely take additional samples each time the transducer is at the bearing $\phi$ of the signal source B. Additional samples cannot affect the apparatus in Section III until after the gate (to be described later) is reset which will be after the longest time at which a signal may appear has passed. A sample of an incoming signal as shown by wave $h$ in FIG. 8 from receiver 48 is applied to a linear amplifier 142 by an output lead 143. The amplified signal is applied to a signal attenuator 144 which may be a potentiometer. This attenuator permits the operator to set the gain of the system as by a hand crank 146 so that the rest of Section III will be sensitive only to the prime water pulse $B_p$ from the signal source, which will be the strongest signal, rather than to some random noise.

A signal shown as curve $j$ that has passed the test of attenuation of the potentiometer 144 will trigger pulse amplifier 148 by preadjustment of such amplifier. This amplifier will not respond to signals of less than a predetermined value, thereby rejecting spurious signals and noises that are below acceptable voltage level after attenuation. The output of amplifier 148 shown as curve $k$ is a pulse of standard width and level. This signal is applied to the "set" input 150 of a flip-flop 152 to provide the function known as opening the "gate." The output of element 152, a pulse or curve $l$ on FIG. 8 of "indefinite" length occurring at the time the "set" input is triggered, is applied to an input 154 of a gate 156. The input clock signal, represented by curve $a$, is continuously applied to an input 158 of gate 156 by a lead 160. However, the clock signal does not appear at the output 162 until after the application of the gating signal $l$ from element 152. The output of gate 156, as shown by curve $m$, is then applied to a count down circuit consisting of elements 164, 166, 168, 170 and 172, all of which are flip-flops that are turned on and off by the positive leading edge of signals applied to their respective inputs. Since it takes two pulses at the input to produce one pulse (of increased width) at the output, each of said flip-flops 164, 166, 168, 170 and 172 divides the number of input pulses by two. The output of element 172 is, therefore, a 31.25 c./s. pulse (1,000 c.p.s./2/2/2/2/2) of suitable width for use in the following elements. This 31.25 c./s. pulse is applied to a power amplifier 174 which is capable of providing sufficient power during the pulse time to energize relay 176 on FIG. 6A. Relay 176, by closing the circuit to a D.C. battery 178 provides additional power amplification to the pulse to operate stepping motor 180. The employment of flip-flops 164, 166, 168, 170 and 172 for converting a 1000 c./s. signal to a 31.25 c./s. signal is to be considered optional but preferable since commercially available models of stepping motors do not generally operate above 50 c./s. The rotational output upon a shaft 182 of stepping motor 180 is applied to potentiometers 184, 186 and 188 through mechanical differentials 189 and 190. Output shaft 182 from 180 is mechanically coupled to an input of differential 189 as well as to a variable speed drive 191 by a shaft 192, the output of 191 being coupled to another input of differential 189 by a shaft 193. Accordingly, output shaft 194 of differential 189 can rotate at a different speed than stepping motor shaft 182 as effected by a selective adjustment of variable speed drive 191. Also output shaft 194 of differential 189 is able to drive an output shaft 196 of differential 190, which rotates wipers 197 and 198 of potentiometers 184 and 186, respectively, in 1:1 speed correspondence when another input shaft 199 of differential 190 is stationary. The variable speed drive 191, by manually operable crank 200, permits compensation of the Section III computer for the different speed of sound in water under certain operating conditions, a calibrated indicator 201 for the local speed of sound in water being provided for the convenience of the operator. A limit stop 202 prevents the possibility of physical damage to the potentiometers should their mechanical inputs exceed their physical capacity. The potentiometers 184, 186 and 188 are geared preferably to the stepping motor 180 in the ratio of 1:2:4 in order to produce the mechanical functions of $400t$, $800t$ and $1600t$. A D.C. reference voltage, as by a battery 204, is applied to potentiometers 184 and 186 so that the voltages out of their respective wipers 197 and 198, referred to the zero end of their respective resistive windings, will be equal to $400t$ and $800t$. The zero ends of the resistive windings are raised above ground potential by the application of a voltage proportional to the distance C as generated by potentiometer 126 on wiper 134 (see FIG. 6) by an electrical connection 206 therebetween. The voltage out of wiper 197 of potentiometer 184, referred to ground, is therefore equal to the function $400t+C$. The voltage out of the wiper 198 of potentiometer 186 is, similarly, equal to the function $800t+C$. The voltage from wiper 197 which is equal to $400t+C$ is applied as the excitation for potentiometer 188 whose mechanical input is proportional to $1600t$. The output from wiper 208 of potentiometer 188 is the product of the two functions, $1600t(400t+C)$. The excitation for potentiometer 188 is provided preferably through an isolation amplifier 210 in order to prevent one potentiometer from loading the other.

The total length of the function time that must be generated is dependent on the desired surveillance range (see FIG. 3). For instance, if a range of 20,000 yards is expected, a minimum of 25 seconds must be allowed to permit a target at that range and on the opposite bearing from the sound source to arrive at the receiver. Changes in scale can be readily made by adjusting the excitation voltage levels. Means for doing this are not shown but well-known in the art.

Figure 6A:
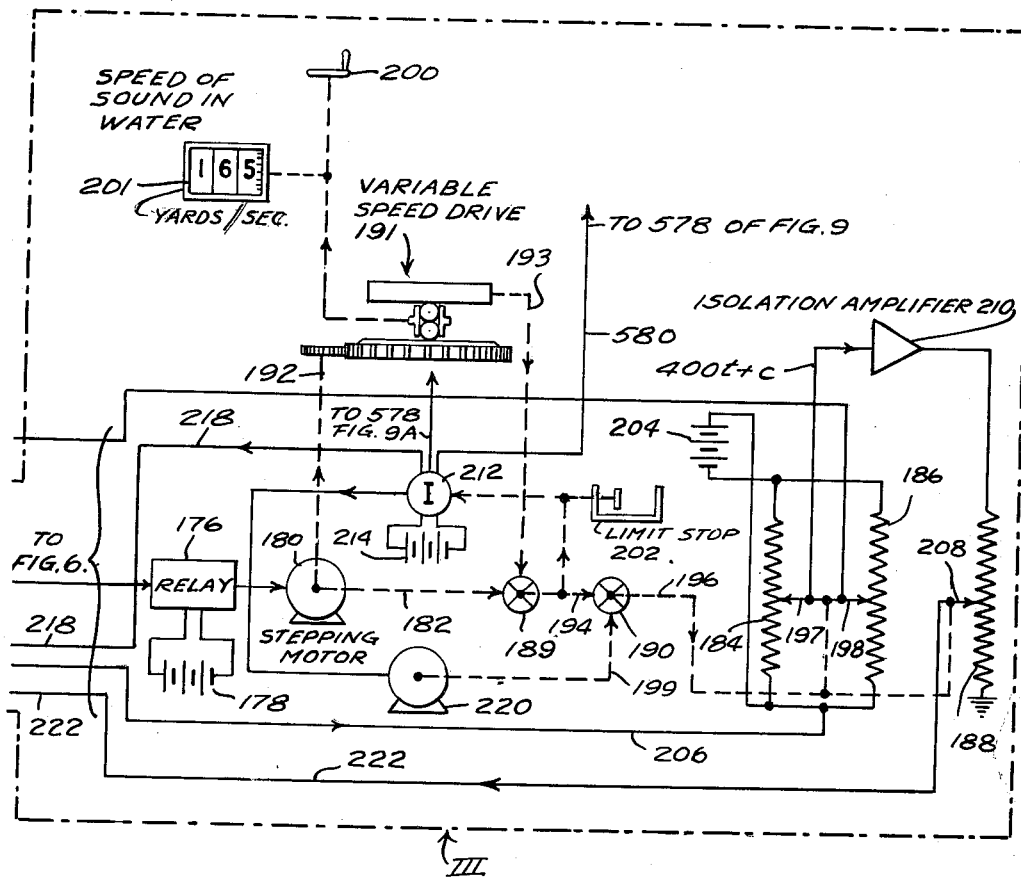

At the end of the maximum time interval fixed by the range, and before initiation of the next sound pulse, the potentiometers 184, 186 and 188 (FIG. 6A), which are rotated as a function of time, must be reset to zero and the timing gate 152 (FIG. 6) closed. The resetting signal is produced by a geared switch shown 212 (FIG. 6A). The switch 212 has a D.C. input, as by a battery 214 and is closed when the computational limit of the potentiometers has been reached and thereby provides a clearing voltage to "reset" input 216 of flip-flop 152 (FIG. 6) over lead connection 218. This clearing voltage closes the gate 156 cutting off the drive to stepping motor 180. At the same time switch 212 provides a voltage to a reset motor 220 which returns the wipers 197, 198 and 208 of the potentiometers 184, 186 and 188 to their zero ends, respectively, through the input shaft 199 of differential 190. When this action has been completed the timing section is prepared to receive the next initiating pulse.

*Section IV.—Division of Generated Functions to Produce R*

The generation of the following two functions has been described previously:

$1600t(400t+C)$ on wiper 208 of potentiometer 188 (FIG. 6A)

and $800t + C - C \cos(\theta - \phi)$ on wiper 128 of potentiometer 124 (FIG. 6)

As they appear in the derived Equation 4, these are the numerator and denominator that define the range or quantity $r$. These two functions are applied by connections 222 and 224, respectively, to a commercial type of D.C. electronic divider 226 (FIG. 6) in order to produce the quantity $r$. These two input functions are sinusoids varying in zero level in accordance with the quantities concerned in their generation. While it may appear to be an anomaly to place an A.C. signal into a D.C. divider, such units are capable of handling the rapid change in input voltage. It is more correct to consider that this is a D.C. computer whose functions vary at a one kilocycle rate.

*Section V.—Multiplication of R by the Sine and Cosine of the Angle Theta to Produce the X and Y Sweep Deflection Voltages*

It is necessary at this point to generate sine and cosine functions of the angle theta ($\theta$). The input clock signal $a$ from generator 100 is applied to the input of pulse amplifier 228 over lead 229. This element provides, at its output, a pulse of predetermined standard width and level that is synchronized to the clock sginal. This pulse is then used to synchronize a sine wave generator 230 having a frequency equal to the clock pulse rate which is assumed to be 1 kc./s. The output of this locked oscillator is a voltage whose instantaneous value is a function of the sine of the angle theta. This voltage is then applied to a D.C. multiplier 232 whose other input is connected to the output of divider 226, the function $r$. The output of element 232 upon lead 234 is, therefore, the function $r \sin \theta$.

The function $r \cos \theta$ is generated upon lead 236 in a similar manner except that the input over lead 237 to a pulse amplifier 238 is the reference clock pulse after it has been delayed by a phase angle of 270° as previously described and shown as curve $c$. When this delayed pulse from the output of element 104 is applied to a 1 kc./s. sine wave generator 240, a cosine voltage function is generated that is synchronized to the reference clock pulse. This cosine function is then applied to one input of a multiplier 242. The other input to 242 is the output of divider 226 or the function $r$, so that the output of 242 is the function $r \cos \theta$ on lead 236.

The function $r \sin \theta$ on lead 234 is applied to X deflection plates 244 of the display oscilloscope 150 and the function $r \cos \theta$ on lead 236 is applied to Y deflection plates 246. The cathode ray beam of tube 50 under the influence of the voltages on its horizontal and vertical plates will display the solution to Equation 3 as previously derived for displaying the underwater targets $T_1$, $T_2$, $T_3$, $T_4$, $T_5$, $T_6$ and $T_7$ relative to the source position S as shown in FIG. 1 after crank 112 is manually adjusted to the known angle $\phi$ and crank 127 is manually adjusted to the known distance 10 or 2C between the source B and the receiver S.

Another embodiment of the invention is shown in FIG. 9 as a modification of FIG. 6 wherein manual adjusting controls 112 and 127 of FIG. 6 are replaced by circuits which insert automatically the quantities $\phi$ (see FIG. 1) and 2C (corresponding to distance 10 in FIG. 1) into the computer for displaying of targets $T_1$, $T_2$, $T_3$, $T_4$, $T_5$, $T_6$ and $T_7$ relative to source B and receiver S.

The theory of the automatic computation of phi ($\phi$) will be explained with reference to FIG. 10 as based on the arrival time at S of the prime water pulse $B_p$ from the sound source B relative to the clock pulses shown as curve $a$ on FIG. 8 which is generated at the instant the sound transducer 49 (see FIG. 6) is listening along the reference heading R (see FIG. 1).

The automatic computation of the distance 2C is based on the difference in arrival time of the prime water pulse $B_p$ at S as received through the water by receiver 48 (FIG. 6) and a direct pulse $B_p'$ preferably provided at S by a radio receiver 500 (FIG. 9) tuned to a radio transmitter (not shown) at source B which is triggered at the instant that a pulse of sound energy is injected into the water.

As an aid in explaining the operation of the circuits in FIGS. 9 and 9A, the overall schematic will be sectionalized as follows: Section VI—Automatic Angle Phi; and Section VII—Automatic Distance 2C. Also, waveforms shown in FIG. 11 will be located on FIG. 9 by corresponding encircled alphabetical letters.

*Section VI.—Automatic Angle Phi*

An oscillator 504 having a frequency N times, for example 1000 times, the frequency of the clock signal generator 100 is used as the basic timing means in Section VI of FIG. 9. The output pulses from 504 at a frequency of 1 megacycle per second are formed into standard shape pulses in squaring amplifier 506. These pulses are fed into decade counters 508, 510, 512, each of which counts down their respective input pulses by a factor of ten.

The output of decade counter 512 is a series of pulses occurring at a one kilocycle rate as shown by curve O on FIG. 11. Originally these pulses are uncoordinated and reflect no information to the device. The first part of each string of pulses is shown in the uncoordinated state.

The prime water pulse $B_p$ shown as curve K on FIG. 8 and curve $p$ on FIG. 11 appears at the output of amplifier 148 on FIGS. 6 and 9 and is applied in FIG. 9 as an input to a reset generator 514 which forms it into a pulse as shown by curve $q$ required to drive the reset inputs 516, 518 and 520 of the decade counters 508, 510 and 512, respectively. The application of the reset pulse serves to reset the decade counters to zero regardless of the counting point they had reached when in their uncoordinated condition. The train of one megacycle input pulses from 504 continues at all times and immediately after reset the train of one megacycle pulses is again counted down in groups of one thousand. The positive rising edge of the output of counter 512 will therefore always bear the same relationship to the basic reference clock pulses (1 kc./s.) from generator 100 as the input signal $B_p$.

Figures 9A, 10:
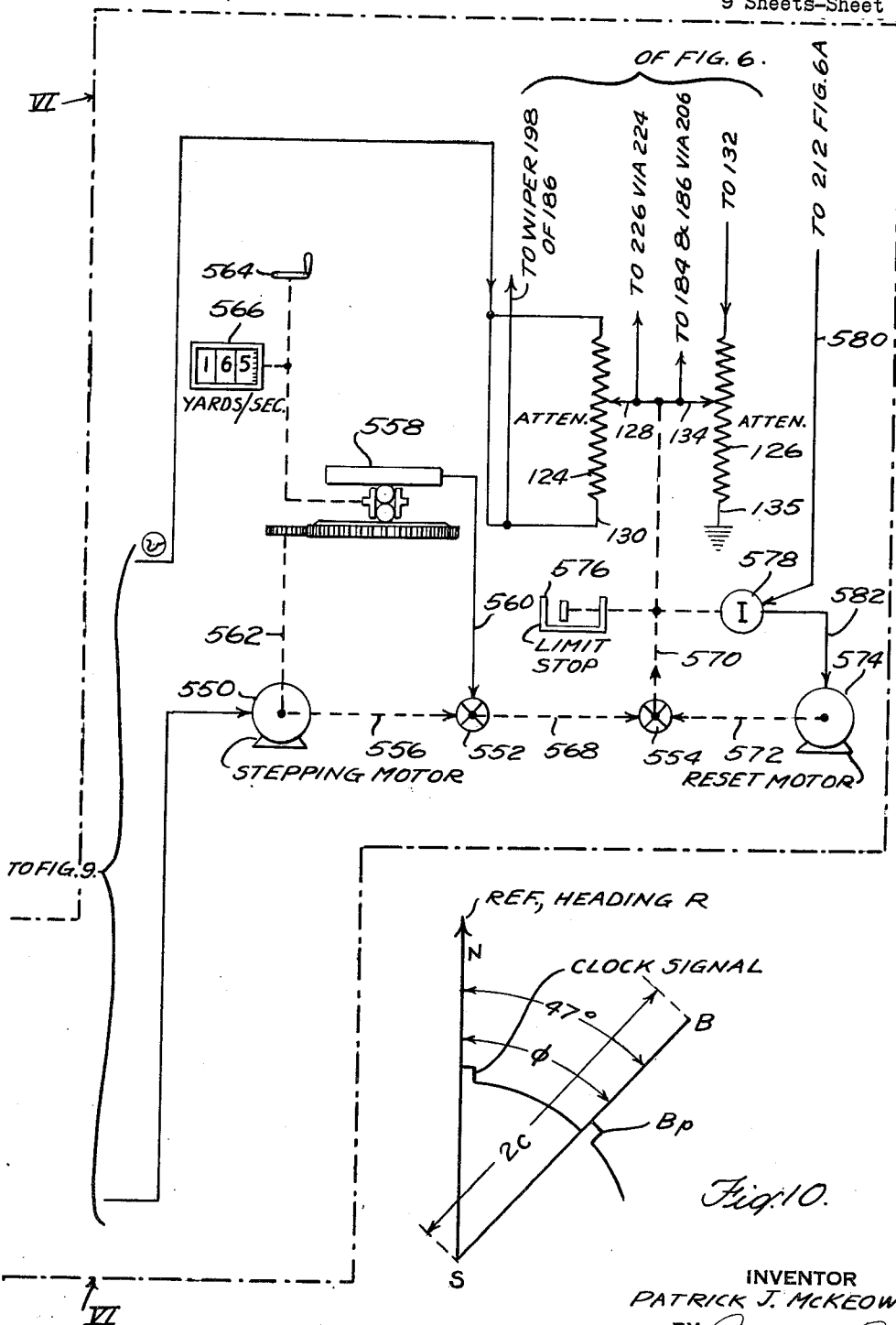
FIG. 10 illustrates the theory of automatically computing the bearing angle of the source at the receiver position.

The time relationship of the clock pulse signal to the output of 512 is therefore a measure of the angle phi, as shown on FIGS. 10 and 11.

The output from counter 512 is then fed to a pulse amplifier 522 which produces a pluse of standard shape as shown by curve $r$ corresponding to the positive rising edge of its input signal from 512. The relative position of the pulse on curve $r$ to the clock pulse on curve $a$ is therefore also a measure of the angle phi.

The output pulses $r$ of 522 are fed to the one-shot multivibrators 524 and 526 connected in series, each of which produces a pulse fixed in width and equal to 270/2 degrees (1000/270/2 microseconds) as shown by curves $s$ and $t$, respectively. The total delay produced by 524 and 526 is equal to 270°, the desired cosine delay previously described for generating a cosine function with a sine wave generator.

The pulse output $t$ of 526 is applied to a pulse amplifier 528 which produces a pulse of standard shape as shown on curve $u$ corresponding to the positive rising edge of the output pulse $t$ of 526. The relationship of this pulse $u$ to the clock pulse $a$ provides a pulse having the characteristics necessary to synchronize a sine wave generator 530 in order to produce the function cosine of the angle theta minus phi, as previously described and now shown on FIG. 11 as curve $v$.

The output [$\cos(\theta-\phi)$] of the synchronized sine wave generator 530 is applied to the resistive winding of potentiometer 124 as shown on FIGS. 6 and 9A.

For the automatic embodiment shown in FIGS. 9 and 9A, the elements 102, 104, 106, 108, 110, 112, 114, 116, 118, 120 and 122 as shown in FIG. 6 are replaced by elements 504, 506, 508, 510, 512, 514, 522, 524, 526, 528 and 530 in FIG. 9.

Section VII.—Automatic Distance 2C

The method of computation of the distance 2C (or 10 in FIG. 1) is based on the equation:

$$2C = (T_{B_p} - T_{B_p}')(1600 + \Delta S_s)$$

where $T_{B_p}'$, is the arrival time of $B_p'$ the direct radio pulse through air;

$T_{B_p}$ is the arrival time of $B_p$, the prime water pulse through water; and $\Delta S_s$ is the difference from nominal of speed of sound in water.

Stated differently, the distance 2C is equal to the length of time that it takes the pulse to travel from the sound source to the receiver multiplied by the speed of sound in the local water.

Referring to FIG. 9, the input clock pulses $a$ from 100, shown in FIGS. 6 and 9, are received at one input terminal 532 of a gate 534 controlled by a flip-flop 536. Flip-flop 536 is "set" (the gate is opened) by the arrival of the input signal at the time it is generated at B as, for example, from a radio receiver 500 operating in a radio link. Once the gate of 534 is opened, the clock pulses $a$ from 100 are fed through to pulse counters such as flip-flops 537, 538, 540, 542 and 544 where they are counted down to produce long width pulses of 31.25 c.p./s. similar to those produced by 164, 166, 168, 170 and 172 shown on FIG. 6.

The output of 544 is applied to a relay driver 546 which merely raises the power level of the pulse so that it is sufficient to operate a relay 548 at the rate of 31.25 c.p./s. The relay 548 by completing the circuit to a battery 549 provides further power amplification required to drive a stepping motor 550 in FIG. 9A. This motor is geared to drive the potentiometers 124 and 126 during the time between the arrival of $B_p$ and $B_p'$. The arrival of the prime water pulse $B_p$ from 148 applied to the "reset" input of gate 536 "close the gate" and stops the action of pulse counting circuits 537, 538, 540, 542 and 544. This stops the rotation of stepping motor 550. The gearing between the motor 550 and potentiometers 124 and 126 of FIGS. 6 and 9 is such as to provide positions for wipers 128 and 134 proportional to the product of time interval between $B_p$ and $B_p'$ and the nominal speed of sound in water of 1600 yards per second. As shown, the wipers 128 and 134 are driven by motor 550 through mechanical differentials 552 and 554 by shafting therebetween. A shaft 556 connects the output of motor 550 to an input of differential 552. Another input of the differential 552 is connected to the output of motor 550 through a variable speed device 558 (commonly known as a mechanical integrator) by shafts 560 and 562. The transfer ratio through device 558 may be adjusted by manual crank 564 in conjunction with a visual display on register 566 in order to add plus or minus increments to the nominal speed of sound in water. The output of the differential 552 on shaft 568 is the sum of the nominal and incremental values in order that the resultant motion of the potentiometer wipers 128 and 134 will be proportional to the true value of the speed of sound in the local water. Elements 558, 552, 560, 562, 564 and 566 may be eliminated should the practical limitations on accuracy due to other considerations make this small correction insignificant.

The output of differential 552 on shaft 568 is fed through differential 554 to a shaft 570 for driving the wipers 128 and 134. Normally the other input gearing line or shaft 572, to differential 554 from a reset motor 574 is held fixed so that only the motion of motor 550 is applied to the potentiometers 124 and 126. The extreme mechanical displacement of shaft 570 is controlled by a mechanical limit stop 576 in order to prevent mechanical damage to the potentiometers 124, 126 should the motors 550, 574 attempt to drive them beyond their physical capacities. The motion of shaft 570 is also applied to a geared switch 578. An electrical connection 580 is made to switch 578 from gear switch 212 shown on FIG. 6A. When the total time of operation of the complete display computer ( FIGS. 6 and 9 combined, is reached and reset functions are initiated through reset motor 220 in FIG. 6A, the reset voltage therefrom is also fed to geared switch 578 in FIG. 9A over lead 580. If the potentiometers 124 and 126 are not at their zero positions 130, 135, geared switch 578 will not be at its zero position either, and the reset voltage will be fed through this switch to reset motor 574 over lead 582 which will drive the potentiometer wipers 128 and 134 back to the zero position in preparation for the next pulse $B_p'$.

Elements having reference numbers below 500 in FIGS. 9 and 9A, such as potentiometers 124 and 126 of FIG. 9A, are the same as those on FIGS. 6 and 6A and the interconnections are referenced with the same reference numbers. However, elements 123, 125 and 127 of FIG. 6 are replaced by elements 500, 536, 534, 537, 538, 540, 542, 544, 546, 548, 549 and 550 to 582 in FIGS. 9 and 9A.

Overall Operation of the Combined Automatic System of FIGS. 6 and 9

An input signal $B_p'$ is received at S (FIG. 1) by radio receiver 500 at the time of generation in the water of the sound pulse at B. At this instant the "Automatic Distance (2C)," Section VII, of the computer begins to function and stepping motor 550 begins to move the wipers 128, 134 of potentiometers 124 and 126 away from their zero position. A short interval of time passes during which the sound is traveling through the water. The prime water pulse $B_p$ arrives at the receiver 48, FIG. 6, and is applied to Sections VI and VII. It is used in the "Automatic Distance (2C)," Section VII, to stop the stepping motor 550. The position of the wipers 128, 134 is therefore proportional to the distance 2C, or 10 in FIG. 1. However, the voltage output is equal to ½ of 2C or C.

The input prime water signal $B_p$ is used to reset the decade counters 508, 510 and 512 so that their output is synchronized as previously described.

The input prime water signal $B_p$ is also applied to the time generation circuits and permits motor 180 (FIG. 6A) to move proportional to the passage of time. This introduces the time functions into the computer, and starts the generation of the elliptical sweep voltages.

After a length of time that is long enough to allow the generation of a sweep covering the range of interest, the geared switch 212 (FIG. 6A) interrupts the foregoing actions by cutting off the time generator 100 in FIG. 6. It also provides excitation to the two reset motors, 220 (FIG. 6A) and 574 (FIG. 9A). These reset motors return their associated potentiometers to their zero positions in preparation for the next input pulse $B_p'$. When reset is completed, the computer is ready for the next cycle. The speed of sound in the local water may be inserted manually on crank 200 (FIG. 6A) or on crank 564 (FIG. 9A). The desired range of the display is adjusted by varying the excitation voltages on the potentiometers in a manner not shown but known in the art.

While there has been described what is at present considered preferred embodiments of the invention, it will be obvious to those skilled in the art that various changes and modifications may be made therein without departing from the invention, and it is, therefore, the intention to be limited only as indicated by the scope of the following claims.

What is claimed is:

1. Display equipment for representing the position of a target comprising a first means displaying a source of pulsed wave energy and a wave energy receiver spaced from said source along a reference direction and having a rotating antenna with a directional characteristic of reception, a second means tracing an ellipse with foci at said source and said receiver, respectively, to establish a path which locates all possible targets from which a pulse of wave energy reflected from said target to said receiver arrives at a time after the unreflected pulse of wave energy travels directly from the source to the receiver, and a third means coupled to said receiver, said third means being responsive to a condition when the directional characteristic of said antenna is directed towards said target for coacting with said second means to display said target on said ellipse, said first means being coupled to said receiver and including means for generating a clock signal when the antenna reception characteristic is pointing towards the reference direction, means for generating a prime signal at the instant when the antenna reception characteristic is pointing towards the source and means measuring the phase relationship between the clock signal and the prime signal.

2. Display equipment according to claim 1 wherein said first means is arranged to display the receiver position along a reference direction and the source position in true azimuth relationship thereto and at a distance from said receiver mathematically corresponding in ratio to the actual displacement between the source and the receiver, the same ratio being applicable as to the displacement between the target and the receiver positions.

3. Display equipment according to claim 1 wherein said first means includes means to vary said ratio.

4. Display equipment according to claim 1 wherein said first mentioned means includes a voltage attenuator which is manually settable in accordance with a predetermined displacement between the source and the receiver.

5. Display equipment according to claim 1 wherein said source simultaneously pulses wave energy into a first medium and into a second medium, and wherein said first means is coupled to said receiver and includes means for generating a prime first medium signal at the instant when a pulse of energy traveling directly from the source to the receiver through the first medium reaches the receiver position, means for generating a prime second medium signal at the instant when said pulse traveling directly from the source to the receiver through the second medium reaches the receiver position and means coupled to said last two mentioned means for generating a signal proportional to the speed of said pulse in said second medium and to the difference in time of generation of said prime second medium signal and said prime first medium signal.

6. Display equipment according to claim 5 wherein said source simultaneously originates a sonar pulse in water and a radio wave pulse in air, said receiver generating said prime first medium signal upon arrival of said radio wave pulse thereat and generating said prime second medium signal upon arrival of said sonar signal thereat.

7. Display equipment according to claim 1 wherein said first means includes means responsive to the angle at the receiver position between a reference direction passing through the receiver position and a line from the receiver position to the source position.

8. Display according to claim 2 wherein said first means includes a voltage attenuator which is manually settable in accordance with a predetermined angle at the receiver position between the reference direction and a bearing line from the receiver position to the source position.

9. In a system for locating targets having a pulsating wave energy source and a receiver spaced therefrom with a revolving directional antenna, display equipment comprising a clock signal generator, means synchronizing said clock signal generator with said revolving antenna so that a clock signal is produced each time said antenna is pointing along a reference direction, a first means coupled to said clock signal generator which is manually settable for delaying the clock signal by the predetermined bearing angle at the receiver position between the reference direction and the said source, a second means coupled to said first means for generating a cosine function, a first and second potentiometer manually settable in accordance with the predetermined distance between said source and said receiver, said first potentiometer being coupled to the said second means, a first D.C. source connected across the said second potentiometer, a third means coupled to said receiver for passing signals above a predetermined threshold, a fourth means coupled to said third means for providing a pulse of predetermined shape upon the occurrence of a signal from said third means, a first gate means coupled to said fourth means, a second gate means coupled to said input clock generator, the output of said first gate means being coupled to control said second gate means, a stepping motor coupled in controlled relationship to said second gate means, a geared switch mechanically coupled to said stepping motor for controlling said first gate means, a second D.C. source, a third and fourth potentiometer connected across said second D.C. source, one side of said third and fourth potentiometers being coupled to one side of said first potentiometer, a fifth potentiometer coupled to the output of said third potentiometer, said third, fourth and fifth potentiometers being mechanically driven by said stepping switch and a divider means coupled at its input side to the outputs of said first and fifth potentiometers.

10. Display equipment according to claim 9, including a first sine wave generator coupled with said clock signal generator for synchronization therewith, a first multiplier having one input coupled to the output of said divider and another input coupled to said first sine wave generator, a second sine wave generator coupled to said second means for synchronization with the output of said clock generator delayed by 270°, and a second multiplier having one input coupled to the output of said divider and another input coupled to said second sine wave generator.

11. Display equipment as claimed in claim 10 including a cathode ray tube having one set of deflection elements coupled to the output of said first multiplier and a second set of deflection elements coupled to the output of said second multiplier.

12. Display equipment as claimed in claim 9 wherein said second means includes a sine wave generator and means coupled to the input side thereof for delaying the clock signal by 270°.

13. Display equipment as claimed in claim 9 including settable means for adjusting the speeds of the mechanical inputs of said third, fourth and fifth potentiometers and said geared switch relative to the output shaft of said stepping motor so as to compensate for the speed of pulse under various operating conditions in the medium transmitting the pulses from said source to said receiver.

14. Display equipment according to claim 13 including a first differential coupled at its inputs to said stepping motor and to the last mentioned means, respectively, a second differential coupled at one input to the output of said first differential and at its output to drive said third, fourth and fifth potentiometers and a reset motor electrically coupled to said geared switch and mechanically coupled to drive another input of said second differential.

15. Display equipment as claimed in claim 9 including a pulse counting down circuit and a relay coupled between the output of said second gate and said stepping motor.

16. In a system for locating targets having a pulsating wave energy source and a receiver spaced therefrom with a revolving directional antenna, display equipment comprising a clock signal generator, means synchronizing said clock signal generator with said revolving antenna so that a clock signal is produced each time said antenna is pointing along a reference direction, a first means coupled to said receiver for passing signals above a predetermined threshold, a second means coupled to said first means for providing a pulse of predetermined shape upon the occurrence of a signal from said first means, a first gate means coupled to said second means, a second gate means coupled to said input clock generator, the output of said first gate means being coupled to control said second gate means, a first stepping motor coupled in controlled relationship to said second gate means, a first geared switch mechanically coupled to said stepping motor and electrically coupled to control said first gate means, a first D.C. source, a first and second potentiometer connected across said first D.C. source, a third potentiometer coupled to the output of said first potentiometer, a third means for generating a signal having a frequency N times the frequency of said clock signal generator, a fourth means coupled at its input to said third means and controlled by said second means for counting down its input signal by a factor of N, a fifth means coupled to said fourth means for generating a pulse of predetermined shape upon the occurrence of an output from said fourth means, a fifth means coupled to the output of said fourth means for generating a cosine function synchronized to the signal output from said fourth means, a sixth means for generating a signal at the instant of a generation of a pulse by said source, a third gate means coupled to said sixth means and controlled by said second means, a fourth gate means coupled to said clock signal generator and in controlled relationship to the said third gate means, a second stepping motor coupled in controlled relationship to said fourth gate means, a fourth and fifth potentiometer mechanically coupled in controlled relationship to said second stepping switch, said fourth potentiometer being coupled across said fifth means, one end of said fourth potentiometer being connected to the output of said second potentiometer, a second D.C. source connected across said fifth potentiometer, the output of said fifth potentiometer being connected to one end of said first and second potentiometers and a divider coupled at its input side to the outputs of said fourth and third potentiometers, respectively.

17. Display equipment according to claim 16 including a first sine wave generator coupled with said clock signal generator for synchronization therewith, a first multiplier having one input coupled to the output of said divider and another input coupled to said first sine wave generator, seventh means coupled to said clock generator for providing a cosine function synchronized therewith, and a second multiplier having one input coupled to the output of said divider and another input coupled to said seventh means.

18. Display equipment as claimed in claim 17 including a cathode ray tube having one set of deflection elements coupled to the output of said first multiplier and a second set of deflection elements coupled to the output of said second multiplier.

19. Display equipment as claimed in claim 18 wherein said seventh means includes a second sine wave generator and means coupled to the input side thereof for delaying the clock signal by 270°.

20. Display equipment as claimed in claim 16 including a first settable means for adjusting the speed of the mechanical inputs of said first, second and third potentiometers and said first geared switch relative to the output shaft of said first stepping motor so as to compensate for the speed of pulses under various operating conditions in the medium transmitting the pulses from said source to said receiver.

21. Display equipment according to claim 20 including a first differential coupled at its inputs to said first stepping motor and to the last mentioned means, respectively, a second differential coupled at one input to the output of said first differential and at its output to drive said first, second and third potentiometers and a reset motor electrically coupled to said first geared switch and mechanically coupled to drive another input of said second differential.

22. Display equipment as claimed in claim 16 including a pulse counting down circuit and a relay coupled between the output of said second gate and said first stepping motor.

23. Display equipment as claimed in claim 16 including a settable means for adjusting the speeds of the mechanical inputs of said fourth and fifth potentiometers relative to the output shaft of said second stepping motor so as to compensate for the speed of pulses under various operating conditions in the medium transmitting the pulses from the source to the receiver.

24. Display equipment as claimed in claim 23 including a first differential coupled at its inputs to said second stepping motor and to the last mentioned means, respectively, a second differential coupled at one input to the output of said first differential and mechanically connected to drive said fourth and fifth potentiometers, a second geared switch electrically controlled by said first geared switch and mechanically controlled by the output of said second differential and a reset motor electrically coupled to said second geared switch and mechanically coupled to drive another input of said second differential.

25. Display equipment as claimed in claim 16 including a pulse count down circuit and a relay between the output of said fourth gate means and said second stepping motor.

26. Display equipment according to claim 16 wherein fifth means includes further means to delay the output of said fourth means by 270°, and a sine wave generator synchronized to said further means.

References Cited in the file of this patent

UNITED STATES PATENTS

| | | |
|---|---|---|
| 913,528 | Marriott | Feb. 23, 1909 |
| 2,515,332 | Budenbom | July 18, 1950 |
| 2,639,422 | Harris | May 19, 1953 |
| 2,971,190 | Busignies | Feb. 7, 1961 |